United States Patent Office 3,340,274
Patented Sept. 5, 1967

3,340,274
HYDROXY AMINO ACID DERIVATIVES
Francis M. Callahan, Stony Point, N.Y., and Joan E. Zimmerman, Hillsdale, N.J., assignors to American Cyanamid Company, Stamford, Conn., a corporation of Maine
No Drawing. Filed June 27, 1962, Ser. No. 205,553
3 Claims. (Cl. 260—326.3)

This invention relates to new amino acid derivatives. More particularly, it relates to tertiary-butyl ethers of hydroxy amino acids and their use in peptide synthesis.

In the synthesis of peptides, it is well known to prevent undesired reactions and obtain only the desired reaction between two amino acids, the amino group of one of the amino acids or peptides involved in the reaction must be effectively protected or blocked from taking part in the reaction while the carboxy group of the other likewise must be so protected. Heretofore, it has generally been customary to protect the carboxy group by converting it into an ester group by way of reaction with a primary alcohol such as methanol or ethanol. The amino group of the amino acid moiety to be attached is usually blocked by a group which can be subsequently removed under the appropriate conditions. The general reaction then becomes one of amide formation, which can be illustrated as follows.

$$RCOOH + H_2NH \longrightarrow RCONHR + H_2O$$

or

wherein R is the amino acid residue. However, a side reaction can occur if the amino acid ester to be acylated has a free hydroxyl group. The side reaction can take place as follows.

wherein R and R' are amino acid residues.

To avoid such a side reaction the hydroxyl function has been blocked in peptide synthesis by the benzyl group, but catalytic removal of commonly used nitrogen protecting groups usually simultaneously unblocks the O- protecting group permitting it to enter in side reactions at the next step.

We have found that the tertiary butyl ethers of amino acids can be employed under peptide forming conditions and can be subsequently removed under surprisingly mild acidic conditions, analogous to the tertiary butyl esters of amino acids. While, in contrast, conditions for removal of the methyl group from methyl ethers of the amino acids are extremely rigorous.

The novel compounds of the present invention are tertiary-butyl ethers of serine, threonine, tyrosine and hydroxyproline and the tertiary-butyl and methyl esters thereof; also the N-carbobenzoxylated derivates of the above and the N-carbobenzoxylated hydrazides thereof. These compounds can be illustrated by the following formula:

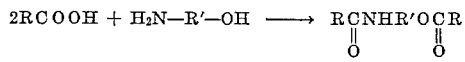

wherein R is selected from the group consisting of hydroxy, methoxy and tert-butyloxy, $R_1$ is selected from the group consisting of hydrogen and carbobenzoxy, $R_2$ is a monovalent radical selected from the group consisting of $(CH_3)_3\text{—}C\text{—}O\text{—}CH_2\text{—}$,

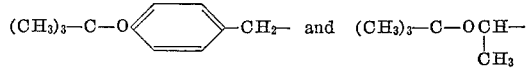

and when $R_1$ and $R_2$ are taken together the divalent radical

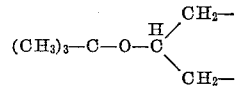

and when $R_1$ is carbobenzoxy then R can be hydrazido.

The free bases of the amino acid ester-ethers of this invention are, in general, distillable liquids capable of forming acid addition salts. The N-carbobenzoxylated amino acid ester-ethers of this invention are, in general, low melting solids or liquids. The N-carbobenzoxylated tertiarybutoxy amino acids and hydrazides of the invention are, in general, lower melting solids. The free amino acid ethers of this invention are similar to typical amino acids and have the characteristics and properties of amino acids.

A preferred method of preparing the tertiary-butyl ethers of the esters of the invention involves, in general, reacting, in an inert water-immiscible solvent, a hydroxy amino acid having a free carboxylic acid group with at least two stoichiometrically equivalent quantities of isobutylene in the presence of an acid actalyst, or a hydroxy amino acid methyl ester with at least one stoichiometrically equivalent quantity of isobutylene in the presence of an acid catalyst. The free amino groups which tend to exert a zwitter-ion effect are prevented from interfering with the reaction by being blocked by a carbobenzoxy group. After ether or ether-ester formation with the isobutylene, the carbobenzoxy group is removed by catalytic hydrogenation, if desired.

Usually the N-carbobenzoxy blocked hydroxy amino acid is first dissolved in a water-immiscible organic solvent. Useful solvents of this type include, for example, methylene chloride and methyl isopropyl ketone. The choice of solvent, however, is not critical, the chief criteria being that it have solvent properties for the reactants, remain inert to the acid catalyst used and should not tend to promote the polymerization of isobutylene. Following dissolution of the N-blocked amino acid moiety in the water-immiscible organic solvent an effective amount of an esterification catalyst such as, for example, sulfuric acid, p-toluenesulfonic acid, etc., is added. The amount of catalyst is not critical but from about 2% to about 12% based on the weight of the N-blocked hydroxy amino acid is preferred. After the addition of the catalyst at least a stoichiometrically equivalent quantity of gaseous isobutylene is passed into the solution. It is usually preferable to use the maximum quantity of isobutylene that will dissolve in the solvent since it is an equilibrium reaction and the cost of isobutylene is relatively low. An exothermic reaction is usually observed during this stage. The temperature range for the isobutylene reaction is not critical, any temperature between 0° and 100° C. being suitable. It is to be understood, however, that in the upper portion of this temperature range the reaction should be conducted under pressure to avoid undue loss of gaseous isobutylene.

Following the addition of isobutylene the resulting reaction mixture is kept for several hours in a closed vessel, after which period isolation of the product is begun by adding a dilute aqueous solution of strong alkali such as sodium hydroxide or triethylamine. The alkali wash is conducted for the purpose of removing unconverted N-carbobenzoxy-blocked hydroxy amino acid from the solvent layer and to neutralize the catalyst. The amount of alkali used is such that there will remain a slight excess of alkali following a neutralization of the unconverted starting material. Following the alkali wash the organic solvent layer is separated, washed with distilled water and dried. The solvent layer contains the tertiary butyl ether of the N-carbobenzoxy-blocked tertiary butyl amino acid ester in essentially pure condition.

In a manner similar to the process described immediately above the N-carbobenzoxylated amino acid methyl esters of the tertiary-butyl ethers of the invention can be prepared by reacting an N-carbobenzoxylated amino acid methyl ester with isobutylene. The conditions for the reaction are similar to those described above and are described in the examples hereinafter.

The N-carbonenzoxylated tertiarybutoxy amino acids can be prepared by saponification of the methyl esters of the N-carbobenzoxy-O-tertiary butyl ethers of the invention as described in Example 5 hereinafter.

The hydrazides of N-carbobenzoxy-O-tertiary butyl ether amino acids of this invention are prepared by reacting a methyl ester of an N-carbobenzoxy-O-tertiary butyl amino acid with hydrazine as shown in Example 7.

The free bases of the tertiary butyl ethers of the invention are prepared by cleavage of the carbobenzoxy blocking group from an intermediate ester of the N-carbobenzoxy-O-tertiary butyl amino acid by catalytic hydrogenation as described immediately below. The tertiary butyl ethers of the amino acids are prepared by saponification of the methyl esters of N-carbobenzoxy-O-tertiary butyl amino acids and then catalytic removal of the carbobenzoxy group. The reaction sequence may be reversed, but this route suffers serious disadvantages, i.e., formation of a diketo piperazine.

The removal of the carbobenzoxy group by catalytic hydrogenation, without disturbing the tertiary butyl ether group, may be effected under conditions well known in the hydrogenation art. The catalyst and the reaction conditions are not critical.

As to the catalyst, any metal normally used for ordinary hydrogenation reaction, e.g., palladium, platinum, nickel (Raney), rhodium, etc., may be used. The amount of catalyst may be varied over a wide range. As to other conditions, the time, temperature and pressure may likewise be varied over a wide range. The reaction solvent is not critical and any relatively inert (to hydrogenation), low molecular weight organic solvent, such as ethanol, is useable.

Usually, it is preferred to dissolve the ether of a N-carbobenzoxy amino acid derivative in absolute ethanol and then add an effective amount of 10% palladium on charcoal, ordinarily about 5 to 15% based on the weight of the N-carbobenzoxy amino acid compound. Following this, hydrogen gas is bubbled through the suspension at about room temperature and atmospheric pressure for at least about an hour, whereupon the suspension is filtered to remove the catalyst and thereby leaving the decarbobenzoxylated material in the filtrate.

The tertiary butyl ether may be obtained from the filtrate by non-critical conventional refining techniques. The ether may be further purified as the acid salt of the amine or as a free amine, or amino acid, the process of purification being contingent on the group affiliated with carboxylic acid function.

For instance, where it is desirable to obtain the free tertiary base of the butyl ether-ester directly, the filtrate may be evaporated to dryness or it may be subjected to fractional distillation under reduced pressure. Alternatively, to recover the ether by way of the preparation of an intermediate salt such as phosphorous acid, the filtrate of the above is reduced in volume by application of reduced pressure. Whereupon about a stoichiometrically equivalent quantity of phosphorous acid in a water-immiscible organic solvent such as diethyl ether is added. The phosphite salt precipitates, is separated and stored as such. Alternatively the acid salt is resuspended in a suitable water-immiscible organic solvent such as diethyl ether, whereupon the solvent suspension is shaken with an aqueous alkali solution, the solvent layer separated, washed with distilled water and dried. The dried residue is then distilled to yield the free tertiary butyl ether-ester base.

The following examples describe in detail the preparation of representative tertiary butyl ethers and other derivatives of hydroxy amino acids.

EXAMPLE 1

*Preparation of tert-butyl O-tert-butyl-N-carbobenzoxy-DL-serinate*

The compound carbobenzoxy-DL-serine [described in J. Biol. Chem., 105, 551 (1934)] (12 g.) is suspended in 500 ml. of methylene chloride with stirring. Isobutylene is bubbled through the solution and 2 ml. of concentrated sulfuric acid is slowly added. Addition of isobutylene is continued for a period of 3 hours. The flask is then stoppered and permitted to stand overnight at room temperature. The solution is successively extracted with 200 ml. portions of 10% sodium bicarbonate, water, N-hydrochloric acid and water, then dried over anhydrous sodium sulfate. The solvent is removed by evaporation to give a residue of 12.2 g. (70%) as a cloudy oil. The oil is filtered through diatomaceous earth and on analysis is found to agree closely with the theoretical values for the product identified above.

EXAMPLE 2

*Preparation of tert-butyl O-tert-butyl-N-carbobenzoxy-L-tyrosinate*

The compound carbobenzoxy-L-tyrosine, commercially available (103 g., 0.327 mole), is added to 700 ml. of methylene chloride (solvent) which contains 3.0 ml. concentrated sulfuric acid as a catalyst. Gaseous isobutylene is bubbled into the stirred suspension with solution rapidly taking place. The solution is kept in a stoppered flask overnight. By extraction of the methylene chloride solvent with 200 ml. of 5% sodium bicarbonate solution, and subsequent evaporation of the organic solvent, a mixture of tert-butyl O-tert-butyl-N-carbobenzoxy-L-tyrosinate and tert-butyl-N-carbobenzoxy-L-tyrosinate amounting to 129 g. is obtained.

EXAMPLE 3

*Preparation of tert-butyl O-tert-butyl-N-carbobenzoxy-L-threoninate*

A mixture of tert-butyl O-tert-butyl-N-carbobenzoxy-L-threoninate and tert-butyl-N-carbobenzoxy-L-threoninate is prepared as described in Example 2 by addition of isobutylene to carbobenzoxy-L-threonine described in J. Biol. Chem. 232, 43 (1958).

EXAMPLE 4

*Preparation of tert-butyl O-tert-butyl-N-carbobenzoxy-L-hydroxyproline*

This product is prepared by the process described in Example 1 from carbobenzoxy-L-hydroxyproline described in J.A.C.S., 79, 189 (1957).

EXAMPLE 5

*Preparation of O-tert-butyl-N-carbobenzoxy-DL-serine*

To a methanolic solution of methyl O-tert-butyl-N-carbobenzoxy-DL-serinate (prepared as in Example 4) (3.1 g., 0.10 mole) is added 10 ml. of 2 N-sodium hydroxide solution. The solution is shaken manually for 10 minutes and permitted to stand for an additional 15 minute period. The product is precipitated by the addition of acetic acid and then the methanol removed by distillation. The residue is extracted into methylene chloride and the solvent removed by evaporation. The latter residue is redissolved in 10% sodium bicarbonate solution, the solution extracted with ether, and the aqueous layer is acidified to yield 2.1 g. of crude product, melting point 46–48° C. Recrystallization from isopropanol-water raised the melting point to 48°–50° C. with a recovery of 1.8 g. Exposed to air, the material spontaneously formed a gum and recrystallized in a 3 day period. The material now melted at 58°–60° C. The chemical analyses for the two forms were the same.

The optically active L-compound is similarly prepared and has the melting point 87.0–87.5° (cyclohexane). $[\alpha]_D^{24}+22.7°$ (c. 1.986, ethanol).

EXAMPLE 6

*Preparation of methyl O-tert-butyl-N-carbobenzoxy-DL-serinate*

This product is prepared by the method described in Example 1 by addition of isobutylene to methyl N-carbobenzoxy-DL-serinate described in J. Biol. Chem., 146, 463 (1942).

EXAMPLE 7

*Preparation of O-tert-butyl carbobenzoxy-DL-serine hydrazide and O-tert-butyl carbobenzoxy-L-serine hydrazide*

Methyl O-tert-butyl-N-carbobenzoxy-DL-serinate (3.09 g., 0.01 mole) which is prepared as described in Example 6 and hydrazine hydrate (0.485 ml., 0.011 mole) are dissolved in 35 ml. of methanol and the reaction mixture is permitted to stand at room temperature overnight. After a refluxing period of 2.5 hours, the solvent is removed under reduced pressure and the solid reside triturated with 40 ml. of N-hydrochloric acid. Filtration yields 2.06 g. of crystalline material of melting point 77°–79° C. The filtrate is made alkaline with solid sodium bicarbonate and extracted with 2×30 ml. of ether. Evaporation of the ether layer results in 0.6 g. (18%) of white crystals, melting point 112°–114° C. The recovered starting material is combined with hydrazine hydrate (99%) dissolved in ethanol and refluxed for 3 hours. Another 0.47 g. (melting point 112°–113° C.) of product is isolated in the same manner as before. The total, 1.05 g. (28%) is recrystallized from isopropyl ether yielding 0.63 g., melting point 112°–113° C., then from ethyl acetate-petroleum ether (boiling point 30–60°) giving 0.5 g., melting point 113.5°–114° C. The sample is dried under reduced pressure at the boiling point of acetone.

The L analog is prepared in a similar manner in 13% yield, melting point 112.5–113.5° C. (ethyl acetate-petroleum ether). $[\alpha]_D^{25}+14.5°$ (c. 1.98, ethanol).

EXAMPLE 8

*Preparation of tert-butyl O-tert-butyl-DL-serinate*

The compound tert-butyl O-tert-butyl-N-carbobenzoxy-DL-serinate (8.2 g., 0.028 mole) from Example 1 is dissolved in 100 ml. ethanol and 3.0 g. of palladium on charcoal as catalyst is added under a nitrogen atmosphere. The solution is hydrogenated for 3 hours until evolution of carbon dioxide has ceased. The catalyst is filtered under nitrogen and the filtrate concentrated under reduced pressure. The oily residue is distilled under reduced pressure.

EXAMPLE 9

*Preparation of tert-butyl O-tert-butyl-L-tyrosinate*

The mixture obtained in Example 2 is reduced in 300 ml. of ethanol in the presence of 7.0 g. of 10% palladium on charcoal. After removal of the catalyst by filtration, the filtrate is concentrated to a volume of 40 ml. at reduced pressure. The alcoholic solution is shaken with a mixture of N-hydrochloric acid and methylene chloride. The aqueous layer is made alkaline with solid sodium bicarbonate, causing tert-butyl-L-tyrosinate to precipitate. Evaporation of the methylene chloride solution leaves 60 g. of tert-butyl O-tert-butyl-L-tyrosinate as the hydrochloride. One gram is recrystallized from isopropyl acetate giving a material with melting point 159°–160° C. A second recrystallization left the melting point unchanged. $[\alpha]_D^{25}+41°$ (c. 3.14, ethanol) and $[\alpha]_D^{25}+42°$ (c. 1.75, dimethylformamide).

EXAMPLE 10

*Preparation of tert-butyl O-tert-butyl-L-threoninate*

*Procedure A.*—The mixture from Example 3, without further purification, is hydrogenated in ethanol over 10% palladium on charcoal at atmospheric pressure to yield a mixture of tert-butyl O-tert-butyl-L-threoninate and tert-butyl-L-threoninate. The two bases cannot be separated by fractional distillation. After their simultaneous conversion to the phosphite salts, the two bases are separated in the molar ratio of 2:1 of ether-ester to ester by a fractional crystallization from a mixture of ether-petroleum ether (boiling point 30–60°). The tert-butyl-L-threoninate salt crystallized first, melting point 139°–141° C. Recrystallization from ethanol-petroleum ether raises the melting point to 140°–141° C. The tert-butyl O-tert-butyl-L-threoninate salt, melting point 70°–72° C., crystallized after the addition of petroleum ether to the filtrate. Recrystallization from ether-petroleum raises the melting point to 74°–76° C. Chromatography in the solvent system secbutanol 3% ammonia, 3:1 on silica gel plates gives $R_f$ values of 0.65 and 0.75 for mono and ditert butyl derivatives, respectively.

*Procedure B.*—The compound tert-butyl O-tert-butyl-N-carbobenzoxy-L-threoninate, prepared as above, is purified on an alumina column to give a clear oil. Tert-butyl O-tert-L-theoninate is then prepared by hydrogenation of the carbobenzoxy derivative as described above.

EXAMPLE 11

*Preparation of tert-butyl O-tert-butyl-L-hydroxyprolinate*

This product is prepared from tert-butyl O-tert-butyl-N-carbobenzoxy-L-hydroxyprolinate (the product of Example 4) by the same procedure as described in Example 8.

EXAMPLE 12

*Preparation of O-tert-butyl-DL-serine and O-tert-butyl-L-serine*

The compound O-tert-butyl-N-carbobenzoxy-DL-serinate (Example 8) (2.95 g., 0.01 mole) is dissolved in 100 ml. of ethanol. Then 2 g. of 10% palladium on charcoal is added under a nitrogen atmosphere and hydrogen is then bubbled through the suspension. After a one hour period the catalyst is filtered off under a nitrogen atmosphere. The ethanol is removed under reduced pressure to yield an off-white crystalline solid, melting point 150–180° (decomposition). The product is recrystallized by dissolving it in 20 ml. of water and adding acetone until crystallization begins. The yield is 0.97 g. having a melting point of 200°–205° C. with decomposition. After one more recrystallization from a water-acetone mixture no change in melting point is observed.

The L analog is prepared by a similar reaction using the appropriate aminoacid.

EXAMPLE 13

*Preparation of methyl O-tert-butyl-N-carbobenzoxy-L-tyrosinate*

This product is made as described in Example 1 by addition of isobutylene to methyl N-carbobenzoxy-L-tyrosinate. The starting methyl N-carbobenzoxy-L-tyrosinate is prepared by carbobenzoxylation of methyl tyrosinate.

EXAMPLE 14

*Preparation of methyl O-tert-butyl-N-carbobenzoxy-L-threoninate*

This product is prepared as described in Example 1 by addition of isobutylene to methyl N-carbobenzoxy-L-threoninate. The starting methyl N-carbobenzoxy-L-threoninate is prepared by carbobenzoxylation of methyl threoninate.

EXAMPLE 15

*Preparation of O-tert-butyl-N-carbobenzoxy-L-tyrosine*

This product is prepared by the method described in Example 5 from methyl O-tert-butyl-N-carbobenzoxy-L-tyrosine, the product of Example 13.

EXAMPLE 16

*Preparation of O-tert-butyl-N-carbobenzoxy-L-threonine*

This product is prepared as described in Example 5 from methyl O-tert-butyl-N-carbobenzoxy-L-threoninate, the product of Example 14.

EXAMPLE 17

*Preparation of methyl O-tert-butyl-L-serinate*

This product is prepared as described in Example 8 by catalytic reduction of methyl O-tert-butyl-N-carbobenzoxy-L-serinate, which is prepared as described in Example 6. The compound is isolated and stored as its phosphite salt, melting point 133°–134° C. The $R_f$ value of the base in chloroform-methanol 2:1 was 0.61.

We claim:

1. A compound of the formula:

$$R_2-\underset{R_1NH}{CH}-\overset{O}{\underset{\|}{C}}-R$$

wherein R is hydrazido, and $R_1$ and $R_2$ are the divalent radical

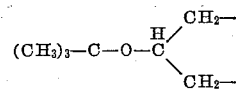

2. The compound tert-butyl O-tert-butyl-N-carbobenzoxy-DL-serinate.

3. The compound tert-butyl O-tert-butyl-DL-serinate.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,606,155 | 8/1952 | Hill | 252—149 |
| 2,833,810 | 5/1958 | Kissman et al. | 260—471 |
| 2,932,664 | 4/1960 | Roberts | 260—534 |
| 2,951,849 | 9/1960 | Gutmann et al. | 260—326.3 |
| 2,954,384 | 9/1960 | Tatsuoka et al. | 260—326.3 |
| 2,969,386 | 1/1961 | McElroy | 260—471 |
| 2,980,728 | 4/1961 | Burk | 260—471 |
| 3,243,423 | 3/1966 | Beyerman | 260—482 |

OTHER REFERENCES

Callahan et al.: Chemical Abstracts, vol. 55, (1961), pp. 3451d to 3452c relied on.

Wagner Zook: "Synthetic Organic Chemistry" (1953), pp. 232–233.

LORRAINE A. WEINBERGER, *Primary Examiner.*

NICHOLAS S. RIZZO, *Examiner.*

J. TOVAR, L. A. THAXTON, *Assistant Examiners.*